United States Patent [19]

Chung

[11] Patent Number: 5,761,283
[45] Date of Patent: Jun. 2, 1998

[54] MESSAGE PROCESSING METHOD OF FACSIMILE SYSTEMS

[75] Inventor: Jong-Un Chung, Seoul, Rep. of Korea

[73] Assignee: SamSung Electronics Co., Ltd., Suwon, Rep. of Korea

[21] Appl. No.: 614,933

[22] Filed: Mar. 11, 1996

[30] Foreign Application Priority Data

Jun. 16, 1995 [KR] Rep. of Korea .................. 16002/1995

[51] Int. Cl.⁶ .................. H04M 11/00; H04M 1/64
[52] U.S. Cl. .................. 379/100.06; 379/67; 379/88; 358/442
[58] Field of Search .................. 379/100, 96–98, 379/93, 100.01, 100.06, 100.15, 100.16, 67, 88, 142; 358/441, 442, 468, 434–440

[56] References Cited

U.S. PATENT DOCUMENTS

| | | | |
|---|---|---|---|
| 4,136,261 | 1/1979 | Wada . | |
| 4,353,097 | 10/1982 | Takeda et al. | 379/100 |
| 4,800,439 | 1/1989 | Yoshino . | |
| 4,815,121 | 3/1989 | Yoshida . | |
| 4,908,851 | 3/1990 | Kotani et al. . | |
| 4,932,048 | 6/1990 | Kenmochi . | |
| 5,014,296 | 5/1991 | Saigano | 379/100 |
| 5,086,455 | 2/1992 | Satomi et al. . | |
| 5,187,736 | 2/1993 | Moriizumi | 379/100 |
| 5,202,915 | 4/1993 | Nishii . | |
| 5,255,311 | 10/1993 | Yoshida . | |
| 5,333,179 | 7/1994 | Yamamoto et al. . | |
| 5,426,518 | 6/1995 | Ohyanagi . | |
| 5,442,463 | 8/1995 | Ohnishi . | |
| 5,444,771 | 8/1995 | Ohnishi . | |
| 5,459,581 | 10/1995 | Ohyanagi . | |
| 5,487,105 | 1/1996 | Sakai . | |
| 5,524,140 | 6/1996 | Klausner et al. | 379/96 |
| 5,544,233 | 8/1996 | Sugino | 379/100 |
| 5,596,629 | 1/1997 | Yoshida | 379/100 |

FOREIGN PATENT DOCUMENTS

62-281655  12/1987  Japan .................. 379/100

*Primary Examiner*—Wing F. Chan
*Attorney, Agent, or Firm*—Robert E. Bushnell, Esq.

[57] ABSTRACT

A method of processing a call back message in a facsimile system performing a voice communication function after communication of the image data is completed. A ring signal is generated in response to reception of a voice communication request signal requesting for a voice communication after completion of the image data communication. If the intended recipient of the receiving facsimile system is not available to answer the voice communication request, identification information of a counterpart's facsimile system and communication time are stored in a memory for a visual display in order to inform the intended recipient to call back at some later time.

18 Claims, 4 Drawing Sheets

MESSAGE PROCESSING METHOD OF FACSIMILE SYSTEMS

CROSS-REFERENCE TO RELATED APPLICATION

This application makes reference to, incorporates the same herein, and claims all benefits accruing under 35 U.S.C. §119 arising from an application for MESSAGE PROCESSING METHOD OF FACSIMILE SYSTEM earlier filed in the Korean Industrial Property Office on 16 Jun. 1995 and there duly assigned Ser. No. 16002/1995.

BACKGROUND OF THE INVENTION

1. Technical Field

The present invention relates to a message processing method of a facsimile system, and more particularly, to a method of a facsimile system capable of, when voice communication is requested from a counterpart's facsimile system after completing facsimile communication of image data, responding to the voice communication.

2. Background Art

Generally, a facsimile system having facsimile and telephone functions such as, for example, U.S. Pat. No. 4,908,851 for Facsimile Apparatus Operable In Facsimile Or Conversation Mode issued to Kotani et al., U.S. Pat. No. 5,255,311 for Data Communication Apparatus issued to Yoshida, and U.S. Pat. No. 5,487,105 for Facsimile Apparatus Operable In Facsimile Or Telephone Mode issued to Sakai, is well known in the art for selectively operating between a facsimile mode and a voice or conversation mode. Some other facsimile systems such as disclosed, for example, in U.S. Pat. No. 5,086,455 issued to Satomi et al., U.S. Pat. No. 5,333,179 issued to Yamamoto et al., U.S. Pat. Nos. 5,442,463 and 5,444,771 issued to Ohnishi, and U.S. Pat. No. 5,459,581 issued to Ohyanagi, are further constructed with an automatic telephone answering device for recording a voice message from a calling subscriber. While these traditional facsimile systems allow operations in both facsimile and conversation modes, most however are not adapted to permit a subscriber of one facsimile system to request for voice communication with a subscriber of another facsimile system after the transmission or reception of image data is completed.

Moreover, even in those conventional facsimile systems that provide voice communication between two subscribers after the image data communication is completed, it has been my observation that such provision is not effective. For example, if the intended subscriber of a receiving facsimile system is not in the vicinity of the facsimile system, the voice communication function can not be performed. That is, if a telephone of the receiving facsimile system is not off-hooked, after the voice communication is requested from the counterpart's facsimile system and a ring signal is generated, a speech line in the facsimile system is not established and a call back message is automatically printed. In this situation, if the printed call back message in the facsimile system is checked by another person who is not an intended recipient, the printed call back message has not been well delivered to the intended recipient. Accordingly, there remains a great possibility that the call back message is lost, and the reliability of the message transmission is deteriorated. That is, in the conventional facsimile systems, if the voice communication is not performed upon the request of the voice communication from the counterpart's facsimile system, the call back message is automatically printed, and therefore the possibility of the printed call back message being lost is increased.

SUMMARY OF THE INVENTION

It is therefore an object of the present invention to provide an improved facsimile system which is operable in a facsimile mode and a telephone mode.

It is also an object of the present invention to provide an improved facsimile system which has a function of accepting a voice communication request after communication of the image data.

It is also another object of the present invention to a message processing method of a facsimile system which is capable of automatically storing and providing a visual display of identification information of a counterpart's facsimile system when the intended recipient of the receiving facsimile system is not available to respond to the counterpart's voice communication request after communication of the image data.

These and other objects can be achieved by a message processing method of a facsimile system the present invention which performs a voice communication function through a telephone handset after facsimile communication of image data is completed. The message processing method includes: detecting a communication request signal generated from a calling subscriber requesting voice communication after facsimile communication of image data is completed; generating a ring signal to inform of the voice communication request in response to reception of the communication request signal and checking whether the telephone handset is off-hook; establishing voice communication with the calling subscriber, when the telephone handset is off-hook; storing an identification information of the calling subscriber's facsimile system and a communication time in a memory, when the telephone handset is not off-hook after a predetermined time period; and displaying the stored identification information of the calling subscriber's facsimile system. The identification information of the calling subscriber's facsimile system stored in the memory may also be printed out by an intended recipient of the facsimile system.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
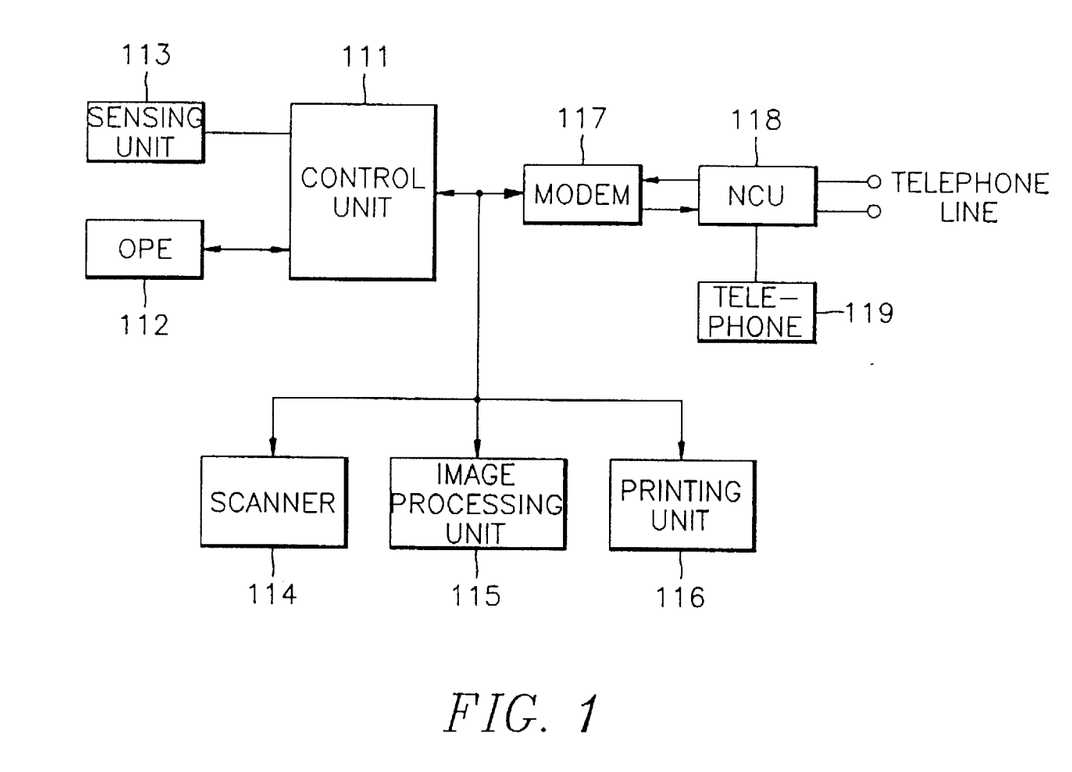
FIG. 1 is a block diagram illustrating a facsimile system constructed according to the principles of the present invention.

Referring now to the drawings and particularly FIG. 1, which illustrates a facsimile system constructed according to the principles of the present invention. The facsimile system includes a control unit 111 for controlling operations of the facsimile system, an operational panel 112, a sensing unit 113, a scanner 114, an image processing unit 11, a printing unit 116, a modem 117, a network control unit NCU 118, and a telephone 119 having a handset.

The control unit 111 contains a program memory such as a ROM (not shown) which stores programs for controlling the general operation of the facsimile system in either one of a transmission mode, a reception mode and a copy mode, and a data memory such as a RAM (not shown) which temporarily stores various information. A call back message program for performing a message processing method of a facsimile system as contemplated by the present invention is stored in the program memory, and a memory area for storing a call back message generated during application of the message processing program is provided in the data memory. The operational panel (OPE) 112 comprises a key input unit and a display unit. The key input unit of the operational panel 112 generates key data to the control unit 111, when pressed by a user for designating each mode of operation and the operation of the designated mode. Further, when the facsimile system is operating in a designated mode of operation such as, for example, a transmission mode, a reception mode and a copy mode, the display unit of the operational panel 112 displays data indicative of the designated mode of operation of the facsimile system while performing each mode. The sensing unit 113 senses whether a document is input into the facsimile system, or whether a copy paper is stored, and generates a sensed signal to the control unit 111. The scanner 114 transports and scans an image of the input document and then generates image data corresponding to the scanned image. The image processing unit 115 processes the image data output from the scanner 114 in order to generate processed image data for either transmission via a telephone line or copy during the copy mode under control of the control unit 111, and processes the image signal received from the telephone line during the reception mode. The printing unit 116 prints the image data received from the image processing unit 115 on a printable medium such as individual sheets of papers during the reception mode and the copy mode under the control of the control unit 111. The modem 117 modulates the image data output from the image processing unit 115 into a modulated image signal for transmission, and duplicates the image signal input to the image processing unit 115 during the reception mode under the control of the control unit 111. The network control unit (NCU) 118 is connected with the telephone line to form transmission and reception paths for the modem 117 under the control of the control unit 111.

Figure 2A:
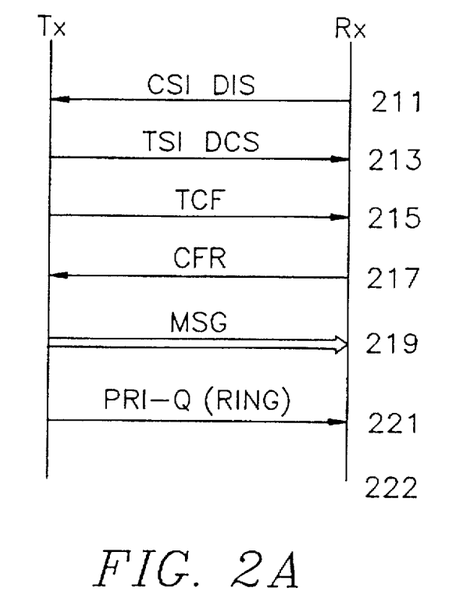
FIG. 2A is a flowchart illustrating a protocol communication procedure between a transmitting subscriber's facsimile system and a receiving subscriber's facsimile system, when voice communication is requested from the transmitting subscriber's facsimile system after transmission of image data.
Figure 2B:
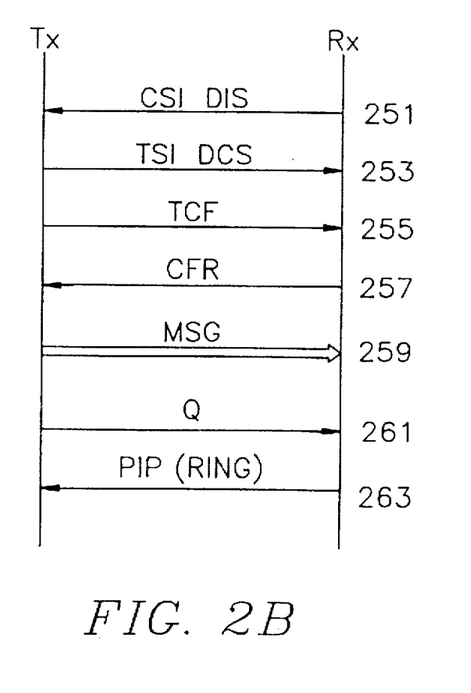
FIG. 2B is a flowchart illustrating a protocol communication procedure between a transmitting subscriber's facsimile system and a receiving subscriber's facsimile system, when voice communication is requested from the receiving subscriber's facsimile system after reception of image data.

FIGS. 2A and 2B illustrate a protocol communication procedure between a transmitting subscriber's facsimile system and a receiving subscriber's facsimile system constructed according to the principles of the present invention for a situation when voice communication is requested from the transmitting subscriber's facsimile system after the transmission of image data, and for a situation when voice communication is requested from the receiving subscriber's facsimile system after the reception of the image data. To further facilitate the understanding of the communication protocol, the abbreviated terms described in FIGS. 2A and 2B are referred to as follows.

As shown in FIGS. 2A and 2B, the abbreviated term "CSI" stands for the called subscriber identification which represents identification (ID) information of the receiving subscriber's facsimile system. This identification information may be, for example, a telephone number of the facsimile system. The abbreviated term "DIS" stands for a digital identification signal which designates capability information of the receiving subscriber's facsimile system, and contains information such as, for example, a transmission velocity, resolution and a particular encoding method used. The abbreviated term "TSI" stands for a transmitting subscriber identification which represents identification information of the transmitting subscriber's facsimile system. The abbreviated term "DCS" stands for a digital command signal which designates set-up capability information of the transmitting subscriber's facsimile system according to the DIS of the receiving subscriber's facsimile. The abbreviated term "TCF" stands for training check data which represents data experimentally communicated before the image data is transmitted according to the set-up capability between the two facsimile systems ie., the transmitting subscriber's facsimile system and the receiving subscriber's facsimile system. The training check data "0" is typically output for one and one half seconds, which output time is equal to the transmission velocity of the image data. The abbreviated term "CFR" stands for confirmation data which represents a command that allows the transmission of an image data when a pre-message including the "TCF" data is received. The abbreviated term "EOM" stands for an end of message which represents a command transmitted in case the resolution of the image data is changed during transmission of the image data and therefore information of the next page is transmitted. The abbreviated term "MPS" stands for a multi-page signal which represents a command transmitted when the transmission of one page is terminated, and then the next page is transmitted. The abbreviated term "EOP" stands for an end-of-procedure which represents a command transmitted when the transmission of the message is terminated and there is no more pages to be transmitted. According to the present invention, each of the EOM, EOP and MPS signal is referred to as a transmission ending signal.

A procedure interrupt-end of message (PRI-EOM) is a command transmitted, when a voice communication requesting key is generated, from the transmitting subscriber's facsimile system in the situation when the resolution is changed during the transmission of the image data, and the next page is transmitted. Accordingly, if voice communication between the transmitting subscriber and the receiving subscriber is not established, that is, the call is not established, the transmission of the image data remains continuous when the resolution is changed. By contrast, however, if the call is established, the transmission is terminated. A procedure interrupt multi-page-signal (PRI-MPS), on the other hand, is a command transmitted, when the voice communication requesting key is generated, from the transmitting subscriber's facsimile system in the situation when the resolution is not changed during the transmission of the image data, and the next page is transmitted. Accordingly, if the call is not established, the next page is continuously transmitted. However, if the call is established, the transmission of the image data is terminated. A procedure interrupt end-of-procedure (PRI-EOP) is a command transmitted, when the voice communication requesting key is generated, from the transmitting subscriber's facsimile system when there is no more pages to be transmitted. Accordingly, if the PRI-EOP signal is generated, the transmission of the image data is terminated regardless of whether or not the call is established. As contemplated by the present invention, the abbreviated term "PRI-Q" represents the PRI-EOM, PRI-EOP and PRI-MPS commands, and "Q" simply represents the EOM, the EOP and the MPS. The "PRI-Q" signal can be referred to as the transmission ending signal in a situation when the call is established. However, when the call is not established, such a "PRI-Q" signal may be referred to as a transmission ending signal as well as a voice communication requesting signal as contemplated by the present invention. The abbreviated term "PIP" stands for a procedure interrupt positive signal which represents a command transmitted for performing the next procedure after all the messages are fully received and the voice communication requesting key is generated. Accordingly, the PRI-EOM, the PRI-EOP and the PRI-MPS are commands generated when the voice communication request is generated from the transmitting subscriber's facsimile system, and the PIP signal is a command generated when the voice communication request is generated from the receiving subscriber's facsimile system.

In the situation when voice communication is requested from the transmitting subscriber's facsimile system after transmission of the image data, the communication procedure is hereinafter described with reference to FIG. 2A. Steps 211 through 217 are implemented as protocol procedure between the transmitting subscriber's facsimile system and the receiving subscriber's facsimile system before the image data is transmitted from the transmitting subscriber's facsimile system to the receiving subscriber's facsimile system. As shown in FIG. 2A, when a call signal from the transmitting subscriber's facsimile system is received by the receiving subscriber's facsimile system via a telephone line, the receiving subscriber's facsimile system first sends, at step 211, a called subscriber identification signal CSI and a digital identification signal DIS which represent respectively the identification information and the receiving capability information of the receiving subscriber's facsimile system. Upon receiving these signals, the transmitting subscriber's facsimile system sends, at step 213, a transmitting subscriber identification signal TSI and a digital command signal DCS to the receiving subscriber's facsimile system which represent the transmission capability information adjusted depending on the reception capability information of the receiving subscriber's facsimile system. The transmitting subscriber's facsimile system then outputs, at step 213, the training check data TCF under the same condition as the transmission velocity of the image data. If the confirmation data CFR is received from the receiving subscriber's facsimile system at step 217, the transmitting subscriber's facsimile system transmits real image data MSG desired to the receiving subscriber's facsimile system at step 219.

During the time when the image data is transmitted in the manner as described above, the control unit 111 of the transmitting subscriber's facsimile system checks the key input unit of the operational panel 112. At this time, if a voice communication requesting key is input from the key input unit of the operational panel 112 of the transmitting subscriber's facsimile system, the control unit 111 of the transmitting subscriber's facsimile system generates a transmission ending signal and voice communication requesting signal PRI-Q to the receiving subscriber's facsimile system requesting voice communication with the receiving subscriber according to the transmission status of the image data ie., whether the transmission of the image data in step 219 is terminated. Here, the transmission ending signal PRI-Q may be the PRI-EOM, PRI-EOP, and PRI-MPS signal as mentioned above.

At this time, if the receiving subscriber's facsimile system receives, at step 221, the transmission ending signal and voice communication requesting signal PRI-Q which represents a request for voice communication from the transmitting subscriber's facsimile and an indication that the transmission of the image data has been terminated. Once the transmission of the image data from the transmitting subscriber's facsimile system is terminated, and the transmission ending signal and voice communication requesting signal PRI-Q requesting for voice communication with the receiving subscriber's facsimile system is received, the receiving subscriber's facsimile system follows a response procedure as shown in FIG. 3 for responding to the voice communication request from the transmitting subscriber's facsimile system.

Figure 3:
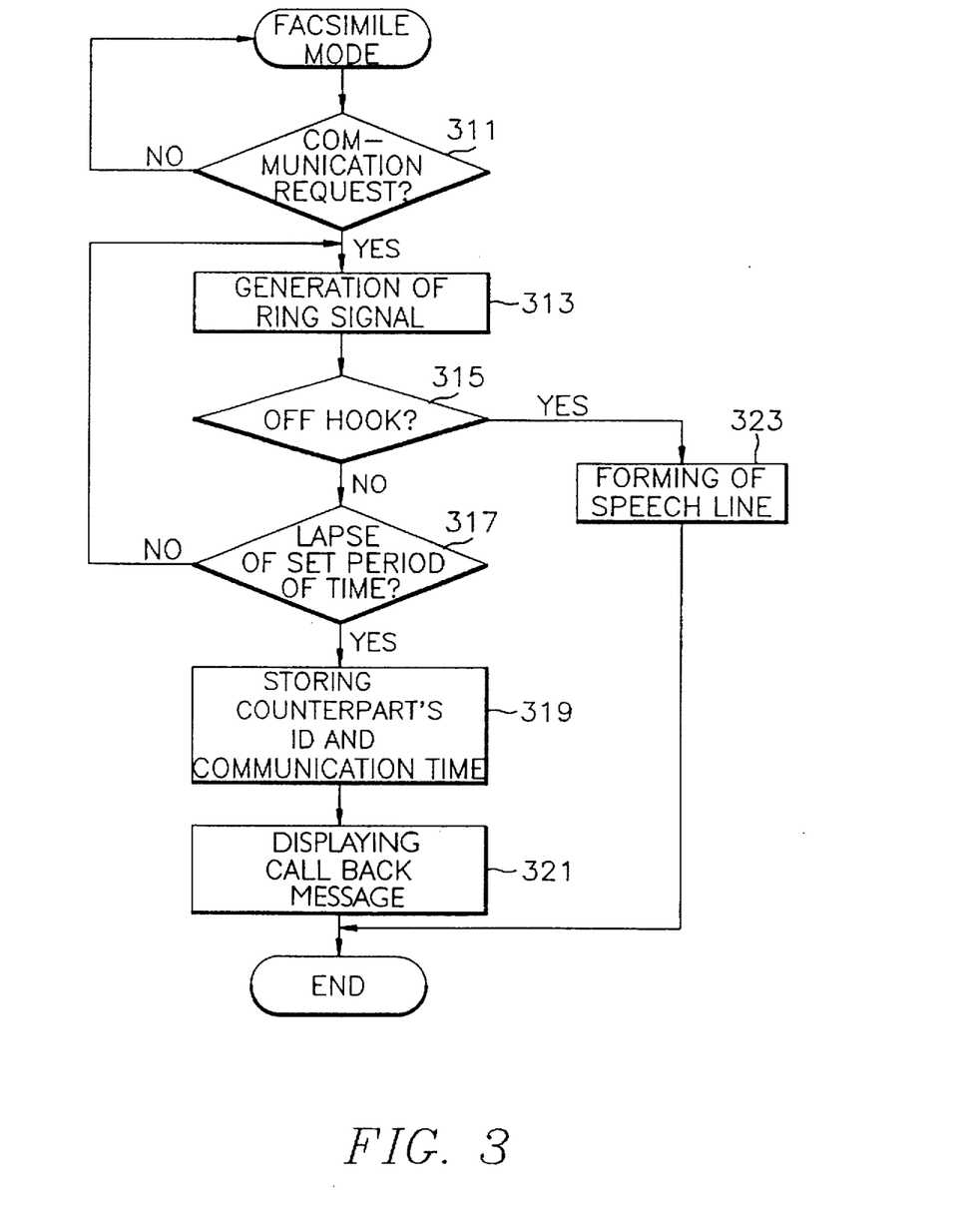
FIG. 3 is a flowchart illustrating a response procedure when voice communication is requested from the counterpart's facsimile system according to a preferred embodiment of the present invention.

Turning now to FIG. 3, which illustrates a response procedure to a voice communication request from a transmitting subscriber's facsimile system. However, this response procedure is applicable whenever a voice communication request signal is generated from a counterpart's facsimile system, that is, from either a transmitting subscriber's facsimile system or a receiving subscriber's facsimile system. As shown in FIG. 3, when a voice communication request signal is generated from a counterpart's facsimile system which, in this example, is a transmitting subscriber's facsimile system, the control unit 111 of a receiving subscriber's facsimile system monitors and receives this signal at step 311. The control unit 11 then controls the NCU 118 to generate a ring signal to the telephone 119 causing the telephone 119 to ring for a number of times, while checking whether the telephone 119 is answered by checking if its handset is off the hook. At this time, if the handset of the telephone 119 is off-hooked i.e. the telephone 119 is answered at step 315, the control unit 111 of the receiving subscriber's facsimile system controls the telephone 119 so that the voice communication function can be established at step 323 in order to allow the two subscribers to engage in the normal telephonic communication.

If, however, the handset of the telephone 119 remains on-hook i.e., the telephone 119 is not answered, the control unit 111 determines whether the ring has elapsed a predetermined time period at step 317. If the ring has not elapsed the predetermined time period, the control unit 111 continues to generate a ring signal to the telephone 119 causing the telephone 119 to ring until either the handset of the telephone 119 is off-hook, or when the ringing passes the predetermined time period. When the ringing passes the predetermined time period, however, the control unit 111 stores the identification information of the transmitting subscribers facsimile system i.e., the counterpart's facsimile system telephone number, and the message receiving or communication time in the data memory for a call back message, and then increases a value of a call back counter by one at step 319. Once the identification information of the transmitting subscriber's facsimile system and the communication time are stored in the data memory, the control unit 111 displays a call back message alerting an intended receiving subscriber to call back the transmitting subscriber and a call back counter number on a displaying unit of the operational panel 112 at step 321. In addition, the control unit 111 also controls the printing unit 116 to print the call back message in response to instruction from the intended receiving subscriber. Separately, the control unit 111 includes a memory erasing mechanism that allows the subscriber of a facsimile system to selectively or categorically erase certain or all the identification information of the counterpart's facsimile system and the communication time stored in the data memory once such identification information serves its intended purposes, that is, to alert the subscriber to call back the calling or transmitting subscriber.

If the call back message is stored as described above for each voice communication request after either the transmission or reception of the image data from the corresponding counterpart's facsimile system, the control unit 111 can maintain a visual display of a single call back message or a number of call back messages on the displaying unit of the operational panel 112. After checking the number of the displayed call back messages, the user can search for a desired call back message by using a specific key in the key input unit of the operational panel 112, delete the desired or undesired call back messages, or if necessary, print only a desired call back message or all call back messages stored in the data memory. Accordingly, since the facsimile system constructed according to the principles of the present invention can select and process the call back message requiring a response, there is no possibility that the call back message can be lost. Therefore, there is an advantage in that even in the situation when the facsimile system cannot respond to a voice communication request, the call back message can be efficiently controlled.

A form of the call back message displayed on the displaying unit of the operational panel 112 may be given as follows.

---

CALL BACK MESSAGE

```
                12-07-95 12:00
                FAX NUMBER: 280 9884
                NAME: SAMSUNG ELECTRONICS
PLEASE CALL BACK ...
PHONE NUMBER: 0546 460 2047
```
---

With reference to FIGS. 2B and 3 which describe the situation when voice communication is requested from a receiving subscriber's facsimile system, rather than from a transmitting subscriber's facsimile system after the reception of the image data, the response procedure will be described hereinafter. First, it should be noted that the protocol communication between the transmitting subscriber's facsimile system and the receiving subscriber's facsimile system remains the same for the transmission and reception of image data as shown in steps 251 through 259.

After the receiving subscriber's facsimile system receives all image data transmitted from the transmitting subscriber's facsimile system for a facsimile print out, the control unit 111 of the receiving subscribers facsimile system determines whether a transmission ending signal Q is received from the transmitting subscriber's facsimile system at step 261, which indicates termination of the reception of the image data in order to perform the voice communication function. Here, the transmission ending signal Q may be the EOM, the MPS or the EOP signal as mentioned previously. Once the transmission ending signal Q is received from the transmitting subscriber's facsimile system, the receiving subscriber's facsimile system ascertains whether a voice communication requesting key signal is generated from the key input unit of its operational panel 112. If a voice communication requesting key signal is generated, that is, when the receiving subscriber presses a voice communication request key form the key input unit of the operational panel 112, the control unit 111 senses this voice communication request key signal and sends a procedure interrupt positive signal PIP to the transmitting subscriber's facsimile system at step 263, requesting voice communication with the intended transmitting subscriber.

Once the procedure interrupt positive signal PIP requesting voice communication is received from the receiving subscriber's facsimile system, the transmitting subscriber's facsimile system performs a communication procedure for voice communication function as shown in FIG. 3. That is, if the procedure interrupt positive signal PIP is received, the control unit 111 of the transmitting subscriber's facsimile system senses this signal at step 311, and controls the NCU 118 to generate a ring signal to the telephone 119 causing the telephone 119 to ring for a number of times, while checking whether the telephone 119 is answered by checking if its handset is off the hook. If the handset of the telephone 119 is off-hooked i.e. the telephone 119 is answered at step 315, the control unit 111 of the transmitting subscriber's facsimile system controls the telephone 119 so that the voice communication function can be established at step 323 in order to allow the two subscribers to engage in the normal telephonic conversation. If the telephone 119 is not answered however, at least until the elapse of a predetermined time period while the telephone 119 remains ringing, the control unit 111 of the transmitting subscriber's facsimile system senses this at step 317, and stores the identification information of the receiving subscriber's facsimile system and the message receiving or communication time in a data memory at step 319 for indicating a call back message. The control unit 111 also increases the value of a call back counter by one which indicates the number of the call back messages being retained in the data memory.

After the identification information of the receiving subscriber's facsimile system and the communication time are stored in the data memory, the control unit 111 of the transmitting subscriber's facsimile system displays a call back message alerting an intended transmitting subscriber to call back the receiving subscriber and a call back counter number on a displaying unit of the operational panel 112 at step 321. Further, the control unit 111 also controls the printing unit 116 to print the call back message in response to instruction from the intended transmitting subscriber. Similarly to the description of FIGS. 2A and 3, the control unit 111 of the transmitting subscriber's facsimile system also includes a memory erasing mechanism that allows the subscriber of a facsimile system to selectively or categorically erase certain or all the identification information of the counterpart's facsimile system and the communication time stored in the data memory once such identification information serves its intended purposes, that is, to alert the subscriber to call back the calling or receiving subscriber.

Again, if the call back message is stored as described above for each voice communication request after the reception of the image data from the receiving subscriber's facsimile system, the control unit 111 of the transmitting subscriber's facsimile system maintains a visual display of a single call back message or a number of call back messages on the displaying unit of the operational panel 112. After checking the number of the displayed call back messages, the subscriber can then search for a desired call back message by using a specific key in the key input unit of the operational panel 112, delete the desired or undesired call back messages, or if necessary, print only a desired call back message or all call back messages stored in the data memory by way of the printing unit 116.

Figure 4:
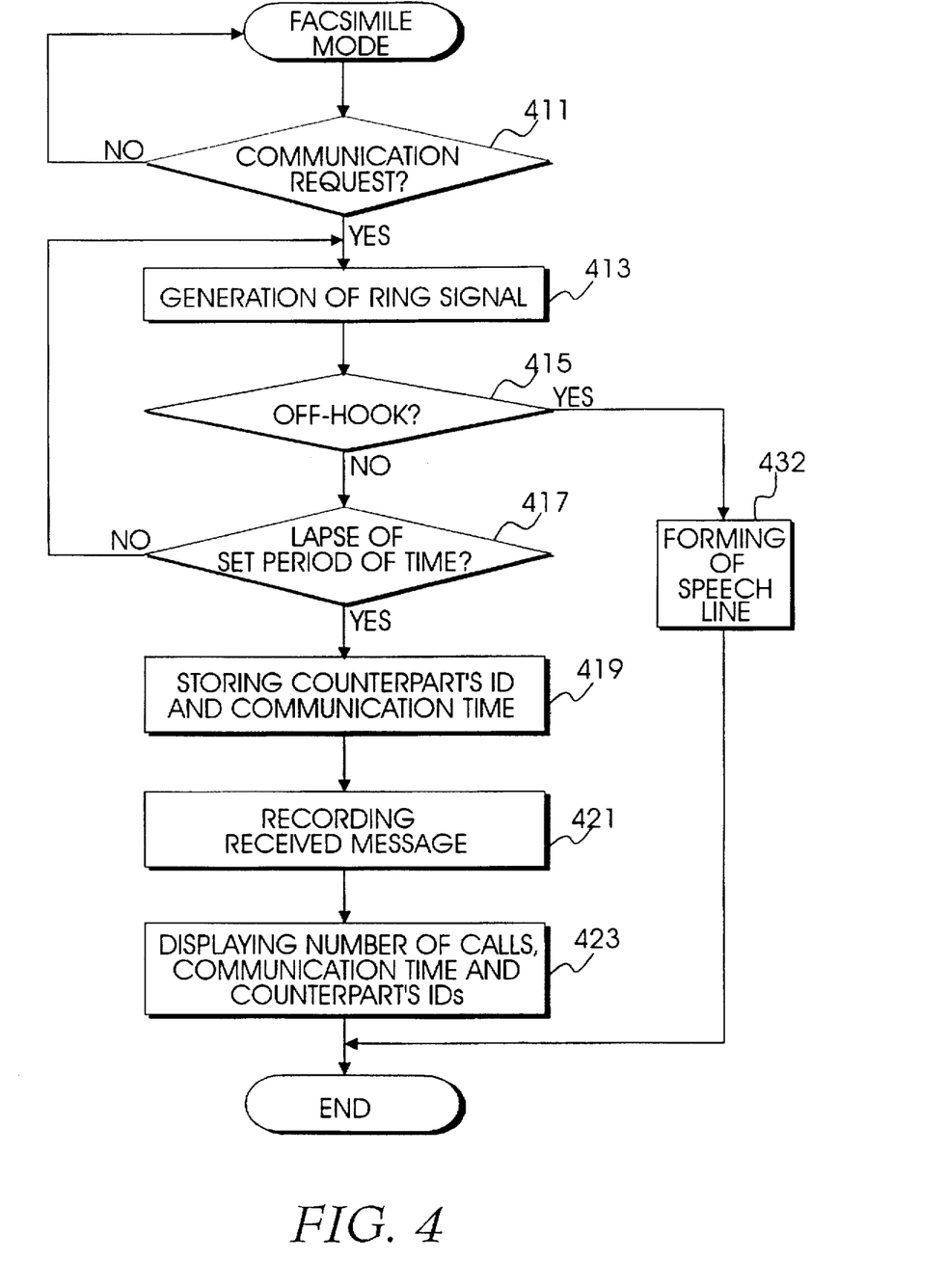
FIG. 4 is a flowchart illustrating a response procedure when voice communication is requested from the counterpart's facsimile system according to another embodiment of the present invention.

FIG. 4 illustrates another response procedure when voice communication is requested from the counterpart's facsimile system. The facsimile system of this embodiment may be constructed to include a recorder unit (not shown) and a playback unit (not shown) for allowing the subscriber of the counterpart's facsimile system to record a brief message or messages on either the recorder unit or the data memory contained in the control unit 111 along with a communication time so that the intended subscriber of the receiving facsimile system can be alerted of such messages. Further, the displaying unit of the operational panel 112 and the printing unit 116 may be implemented to provide a visual display and to print such messages. As shown in FIG. 4, a response procedure to a voice communication request generated from a counterpart's facsimile system (e.g., a transmitting subscriber's facsimile system or a receiving subscriber's facsimile system) is similar to that described in FIG. 3, except that the facsimile system is further constructed to record, store and display a brief message from the transmitting subscriber's facsimile system. For example, when a voice communication request signal is generated from a counterpart's facsimile system, the control unit 111 of a receiving subscriber's facsimile system receives this signal at step 411, and controls the generation of a ring signal to the telephone 119 causing the telephone 119 to ring for a number of times at step 413, while checking whether the telephone 119 is answered by checking if its handset is off the hook at step 415. If the handset of the telephone 119 is off-hooked at step 415, the control unit 111 of the receiving subscriber's facsimile system controls the telephone 119 so that the voice communication function can be established at step 432 in order to allow the two subscribers to engage in the normal telephonic communication. If the handset of the telephone 119 remains on-hook, however, the control unit 111 determines whether the ring has elapsed a predetermined time period at step 417. If the ring has elapsed a predetermined time period, the control unit 111 stores the identification information of the transmitting subscriber's facsimile system such as a telephone number, the communication time in the data memory for a call back message at step 419, and records a received message from the transmitting subscriber at step 421, and then displays the number of calls, the corresponding identification information of the transmitting subscriber's facsimile system and communication time at step 423. In addition, the control unit 111 also controls the printing unit 116 and the playback unit (not shown) to print and playback the call back message in response to specific instruction from the intended receiving subscriber.

While there have been illustrated and described what are considered to be preferred embodiments of the present invention, it will be understood by those skilled in the art that various changes and modifications may be made, and that equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A method of processing a call back message in a facsimile system performing voice communication through a telephone handset after completion of transmission of facsimile communication of image data established during communication protocol exchange with a calling subscriber's facsimile system, said method comprising the steps of:

detecting a communication request signal generated from the calling subscriber requesting voice communication after completion of transmission of said facsimile communication of said image data;

generating a ring signal to inform of the voice communication request in response to reception of said communication request signal and checking whether the telephone handset is off-hook;

establishing voice communication with the calling subscriber, when the telephone handset is off-hook;

automatically storing identification information of the calling subscriber's facsimile system unique to said calling subscriber's facsimile system received during said communication protocol exchange to establish said facsimile communication of said image data, and a communication time in a predetermined format of said call back message in a memory, when the telephone handset is not off-hook after a predetermined time period; and maintaining a visual display of said call back message in said predetermined format containing the identification information of the calling subscriber's facsimile system and the communication time on said facsimile system.

2. The method of claim 1, further printing said call back message containing the stored identification information of the calling subscriber's facsimile system, upon instruction from an intended recipient of said facsimile system.

3. The method of claim 1, further comprised of determining the identification information of the calling subscriber's facsimile system to be stored in said memory from a digital command signal transmitted from the calling subscriber's facsimile system during communication protocol exchange to establish facsimile communication of said image data.

4. The method of claim 1, further storing successive identification information of different calling subscriber's facsimile systems in said memory, each time the communication request signal is generated upon completion of facsimile communication and the telephone handset is not off-hook after said predetermined time period.

5. The method of claim 4, further erasing said call back message containing the stored identification information of the calling subscriber's facsimile system from said memory, upon instruction from an intended recipient of said facsimile system.

6. The method of claim 1, further recording a voice transmission received from the calling subscriber's facsimile system, when the telephone handset is not off-hook after said predetermined time period.

7. A communication method of a first facsimile system in a transmitting subscriber's said first facsimile system and a receiving subscriber's second facsimile system, said communication method comprising the steps of:

transmitting a facsimile request signal from said first facsimile system to said second facsimile system requesting for facsimile transmission, exchanging and confirming communication protocol between said first and said second facsimile system;

transmitting image data from said first facsimile system to said second facsimile system after said communication protocol has been confirmed;

generating a transmission ending signal after transmission of said image data, and determining whether a voice communication key of said first facsimile system is input by the transmitting subscriber requesting for voice communication with the receiving subscriber of said second facsimile system, after the transmission of said image data;

transmitting a voice communication request signal from said first facsimile system to said second facsimile system, when said voice communication key is input by the transmitting subscriber requesting for voice communication with the receiving subscriber of said second facsimile system;

enabling said second facsimile system to generate a ring signal causing a telephone handset of said second facsimile system to ring for a predetermined time period;

determining whether the telephone handset of said second facsimile system is off-hook during said predetermined time period;

enabling said second facsimile system to automatically store identification information of the first facsimile system determined during initial communication protocol exchange between said first and said second facsimile system for said facsimile transmission, and a communication time in an internal memory in a form of a call back message when said second facsimile system is not off-hook during said predetermined time period; and enabling said second facsimile system to provide a visual display of said call back message to alert the receiving subscriber to call back the transmitting subscriber.

8. The communication method of claim 7, further comprised of said transmission ending signal being one of a message ending signal, a multi-page signal and a page ending signal.

9. The communication method of claim 7, further comprised of determining the identification information of the first facsimile system to be stored in said internal memory of said second facsimile system from a digital command signal transmitted from the first facsimile system during said initial communication protocol between said first and said second facsimile system for facsimile transmission of said image data.

10. The communication method of claim 7, further enabling said second facsimile system to automatically store additional call back messages representing successive identification information of different transmitting subscribers from different facsimile systems in said internal memory, each time the voice communication request signal is received at said second facsimile system and the telephone handset of said second facsimile system is not off-hook during said predetermined time period.

11. The communication method of claim 7, further enabling said second facsimile system to erase said call back message representing the identification information of said first facsimile system from said internal memory, upon instruction from the receiving subscriber of said second facsimile system.

12. The communication method of claim 7, further recording a voice transmission received from said first facsimile system, when the telephone handset of said second facsimile system is not off-hook after said predetermined time period.

13. A communication method of a second facsimile system in a transmitting subscriber's first facsimile system and a receiving subscriber's said second facsimile system, said communication method comprising the steps of:

receiving a facsimile request signal transmitted from said first facsimile system requesting for facsimile transmission, exchanging and confirming communication protocol between said first and said second facsimile system;

receiving image data transmitted from said first facsimile system after said communication protocol has been confirmed;

determining whether a transmission ending signal indicating completion of the transmission of said image data is received from said first facsimile system, and determining whether a voice communication key of said second facsimile system is input by the receiving subscriber requesting for voice communication with the transmitting subscriber of said first facsimile system, after reception of said transmission ending signal;

transmitting a voice communication request signal to said first facsimile system when said voice communication key is input by the receiving subscriber requesting for voice communication with the transmitting subscriber of said first facsimile system;

enabling said first facsimile system to generate a ring signal causing a telephone handset of said first facsimile system to ring for a predetermined time period;

determining whether the telephone handset of said first facsimile system is off-hook during said predetermined time period;

enabling said first facsimile system to automatically store identification information of said second facsimile system determined during initial communication protocol exchange between said first and said second facsimile system for said facsimile transmission, and a communication time in an internal memory in a form of a call back message, when said first facsimile system is not off-hook during said predetermined time period; and enabling said first facsimile system to provide a visual display of said call back message to alert the transmitting subscriber to call back the receiving subscriber.

14. The communication method of claim 13, further comprised of said transmission ending signal being one of a message ending signal, a multi-page signal and a page ending signal.

15. The communication method of claim 13, further comprised of determining the identification information of said second facsimile system to be stored in said internal memory of said first facsimile system from a digital command signal transmitted from the first facsimile system during said initial communication protocol between said first and said second facsimile system for facsimile transmission of said image data.

16. The communication method of claim 13, further enabling said first facsimile system to automatically store additional call back messages representing successive identification information of different receiving subscribers from different facsimile systems in said internal memory, each time the voice communication request signal is transmitted but the telephone handset of the transmitting subscriber is not off-hook during said predetermined time period.

17. The communication method of claim 13, further enabling said first facsimile system to erase said call back message representing the identification information of said second facsimile system from said internal memory, upon instruction from the transmitting subscriber of said first facsimile system.

18. The communication method of claim 13, further enabling said first facsimile system to record a voice transmission received from said second facsimile system, when the telephone handset of said first facsimile system is not off-hook during said predetermined time period.

* * * * *